US012698890B1

(12) United States Patent
Rendall

(10) Patent No.: US 12,698,890 B1
(45) Date of Patent: Aug. 4, 2026

(54) SYSTEM AND METHOD FOR PROVIDING PORTABLE AND COMPONENT-INTERCHANGEABLE TASK LIGHTING VIA THE POST BEAM LIGHT SYSTEM

(71) Applicant: Post Beam Light, LLC, San Mateo, CA (US)

(72) Inventor: Thomas Rendall, San Mateo, CA (US)

(73) Assignee: Post Beam Light, LLC

(*) Notice: Subject to any disclaimer, the term of this patent is extended or adjusted under 35 U.S.C. 154(b) by 0 days.

(21) Appl. No.: 19/542,370

(22) Filed: Feb. 17, 2026

Related U.S. Application Data

(60) Provisional application No. 63/759,807, filed on Feb. 18, 2025.

(51) Int. Cl.
*F21V 21/30* (2006.01)
*F21V 33/00* (2006.01)

(52) U.S. Cl.
CPC .......... *F21V 21/30* (2013.01); *F21V 33/0048* (2013.01)

(58) Field of Classification Search
CPC ........ F21V 21/145; F21V 21/22; F21V 21/26; F21V 21/28; F21V 21/29; F21V 21/30; F21V 33/0048
USPC ................. 362/287, 410, 413–414, 419, 431
See application file for complete search history.

(56) References Cited

U.S. PATENT DOCUMENTS 1,521,610 A 1/1925 Finesilver
2,434,986 A 1/1948 Bremer
3,601,598 A 8/1971 Horn
4,700,017 A 10/1987 Morand
4,974,135 A 11/1990 Wen-tsung
5,016,153 A 5/1991 Gismondi
5,265,000 A 11/1993 Lin
5,303,136 A 4/1994 Brown
6,019,484 A * 2/2000 Seyler .................... F21V 21/22 362/403
6,416,207 B1 7/2002 Chang
6,854,862 B1 * 2/2005 Hopf .................... F21V 17/007 362/418
8,408,761 B2 4/2013 Ng
8,602,612 B2 12/2013 Stathis
(Continued)

*Primary Examiner* — Thomas M Sember
(74) *Attorney, Agent, or Firm* — ROARK IP

(57) ABSTRACT

A modular, portable task lighting system and method provide adjustable, glare-free illumination for tasks such as reading sheet music on a piano or working at a desk. The system includes an interchangeable base supporting a vertical post, to which a horizontal cantilevered arm is adjustably clamped for height and rotational positioning. A slidable carriage moves laterally along the arm without vertical sag, coupled to a multi-axis linkage featuring a vertical pivot, secondary articulation joint, and ball-and-socket interface for omnidirectional aiming in three planes. A low-profile light plank, detachably mounted via a quick-connect plate, houses an LED illuminating device with adjustable color temperatures (warm, cool, cold) and brightness, plus motion-detection capability. The upper assembly detaches from the base for folding, reconfiguration, or standalone use of the light plank. Bases include weighted pedestals, C-clamps with resilient grips leveraging intrinsic mounting surface strength (avoiding threaded fasteners), wall mounts, and multi-unit table bars.

18 Claims, 12 Drawing Sheets

(56) References Cited

U.S. PATENT DOCUMENTS

| | | | | |
|---|---|---|---|---|
| 11,744,074 | B2 | 8/2023 | Tsuda et al. | |
| 11,933,474 | B2 | 3/2024 | Hanna | |
| 2006/0120092 | A1 * | 6/2006 | Sapper | F21S 6/003<br>362/427 |
| 2012/0294004 | A1 | 11/2012 | Stathis | |
| 2019/0093866 | A1 * | 3/2019 | Thomas | F21V 21/145 |
| 2020/0325050 | A1 | 10/2020 | Fitch | |

* cited by examiner

100

SYSTEM AND METHOD FOR PROVIDING PORTABLE AND COMPONENT-INTERCHANGEABLE TASK LIGHTING VIA THE POST BEAM LIGHT SYSTEM

CROSS-REFERENCE TO RELATED APPLICATIONS

This application claims the benefit of U.S. Provisional Patent Application Ser. No. 63/759,807 filed Feb. 18, 2025, which is incorporated herein by reference.

FIELD OF THE DISCLOSURE

This invention relates to a system and method for providing task lighting and more particularly to a portable device movable from a lamp-base of one configuration to another lamp-base having a different configuration to allow its lamp's use in distinct task-lighting applications.

BACKGROUND

Task lighting is frequently employed in environments such as residential offices, industrial workstations, and medical facilities to improve visual clarity, reduce eye strain, and eliminate shadows during detail-oriented work. Conventional task lighting often relies on fixed or semi-adjustable luminaires that lack the necessary precision to adapt to the dynamic ergonomic requirements of a user.

SUMMARY

Aspects of this disclosure include a task lighting system comprising: a base and a support frame comprising a vertical section and a horizontal cantilever section; a carriage assembly slidably mounted to the horizontal cantilever section, the carriage assembly including a first locking mechanism to secure the carriage's position; an articulation linkage extending from the carriage assembly; and a lighting panel coupled to the articulation linkage, wherein the linkage provides at least three degrees of rotational freedom for the lighting panel.

Further aspects of the disclosure include a modular task lighting system comprising: a base having a post sleeve; a first post removably inserted into the post sleeve; a first clamp adjustably connecting a second post to the first post, the first clamp configured to permit vertical translation of the second post along the first post and 360-degree rotation of the second post about a vertical axis of the first post; the second post configured as a substantially horizontal cantilevered rail; a second clamp slidably mounted on the second post and configured for lateral translation along the second post without vertical deflection under load, the second clamp comprising a tightening knob to lock the second clamp at a selected position; a multi-axis linkage coupled to the second clamp, the multi-axis linkage comprising: a primary vertical pivot configured for height adjustment, a secondary articulation joint comprising a knob configured for tilt and rotation adjustment, and a ball-and-socket joint configured for pitch and yaw adjustment to enable aiming in three planes; a light plank detachably coupled to the multi-axis linkage via a lamp nut or quick-connect plate, the light plank comprising a low-profile elongated housing supporting an illuminating device; and wherein an upper assembly comprising the first post, the second post, the first clamp, the second clamp, the multi-axis linkage, and the light plank is detachable from the base.

Further aspects of the disclosure include a portable task lighting system comprising: an interchangeable base; a vertical post removably supported by the base; a horizontal cantilevered arm adjustably clamped to the vertical post via a first clamp permitting height and rotational adjustment; a slidable carriage mounted on the horizontal cantilevered arm for lateral positioning without vertical sag; a multi-axis linkage coupled to the slidable carriage, the multi-axis linkage, comprising multiple axes for adjustment in three planes; a detachable light plank coupled to the multi-axis linkage having an LED illuminating device with adjustable color and brightness; and wherein the system is foldable and reconfigurable.

Further aspects of the disclosure include a method of assembling a modular task lighting system comprising: providing an interchangeable base with a post sleeve; removably inserting a first post into the post sleeve; adjustably clamping a second post to the first post using a first clamp to enable vertical translation and rotation; slidably mounting a second clamp on the second post for lateral translation; coupling a multi-axis linkage to the second clamp, the multi-axis linkage including a vertical pivot, articulation joint, and ball-and-socket; detachably coupling a light plank with an illuminating device to the multi-axis linkage via a quick-connect plate; and wherein the method enables tool-less reconfiguration, detachment of an upper assembly for folding, and interchange of the base.

BRIEF DESCRIPTION OF THE DRAWINGS

Aspects of the embodiments of this disclosure are illustrated by way of example. While various details of one or more techniques are described herein, other techniques are also possible. In some instances, well-known structures and devices are shown in block diagram form in order to facilitate describing various techniques. A further understanding of the nature and advantages of examples provided by the disclosure can be realized by reference to the remaining portions of the specification and the drawings, wherein like reference numerals are used throughout the several drawings to refer to similar components. In some instances, a sub-label is associated with a reference numeral to denote one portion or part of a larger element or one of multiple similar components. When reference is made to a reference numeral without specification to an existing sub-label, the reference numeral refers to all such similar components.

DETAILED DESCRIPTION

The present disclosure relates generally to field of localized illumination and, more particularly, to a post beam lighting system and method 100 configured to provide targeted, high-intensity light for specific activities. Task lighting is frequently employed in environments such as piano practice, residential offices, industrial workstations, and medical facilities to improve visual clarity, reduce eye strain, and eliminate shadows during detail-oriented work. Conventional task lighting often relies on fixed or semi-adjustable luminaires that lack the necessary precision and flexibility to adapt to the dynamic ergonomic requirements of a user.

Lamps have been used for delivering task lighting. However, in general, these lamps, typically of the types: gooseneck and articulated, develop problems through use. Both types lose stiffness and sag over time due to material fatigue and friction, making it difficult to maintain a desired position. Some gooseneck and articulated lamps use awkward to install clamps which limit the number and types of surfaces they can be used on, and are subject to wear and breakage especially those made of plastic. There is a need for a simpler, more reliable lamp without springs or screws or conventional clamps for providing task lighting which avoids and overcomes the disadvantages of the foregoing. Conventional task lamps primarily gooseneck and multi-joint articulated designs—rely on friction-based joints, internal springs, or threaded clamping mechanisms for positioning. Over time, these systems exhibit: loss of positional stiffness due to material fatigue, joint wear, and friction degradation, leading to sagging under cantilever loads. Also, conventional lamps have limited mounting options, often restricted to C-clamps or base plates with plastic components prone to cracking or thread stripping. Also, complex assembly is necessary requiring tools which reduces field repairability and portability.

The post beam lighting system and method 100 disclosed herein is simple, portable, disassembles and assembles in seconds, capable of fitting in a backpack, repairable by user via interchangeable parts, and foldable in situ for shipping and storage. It has also has an omnidirectional light beam capability.

Figure 1A:
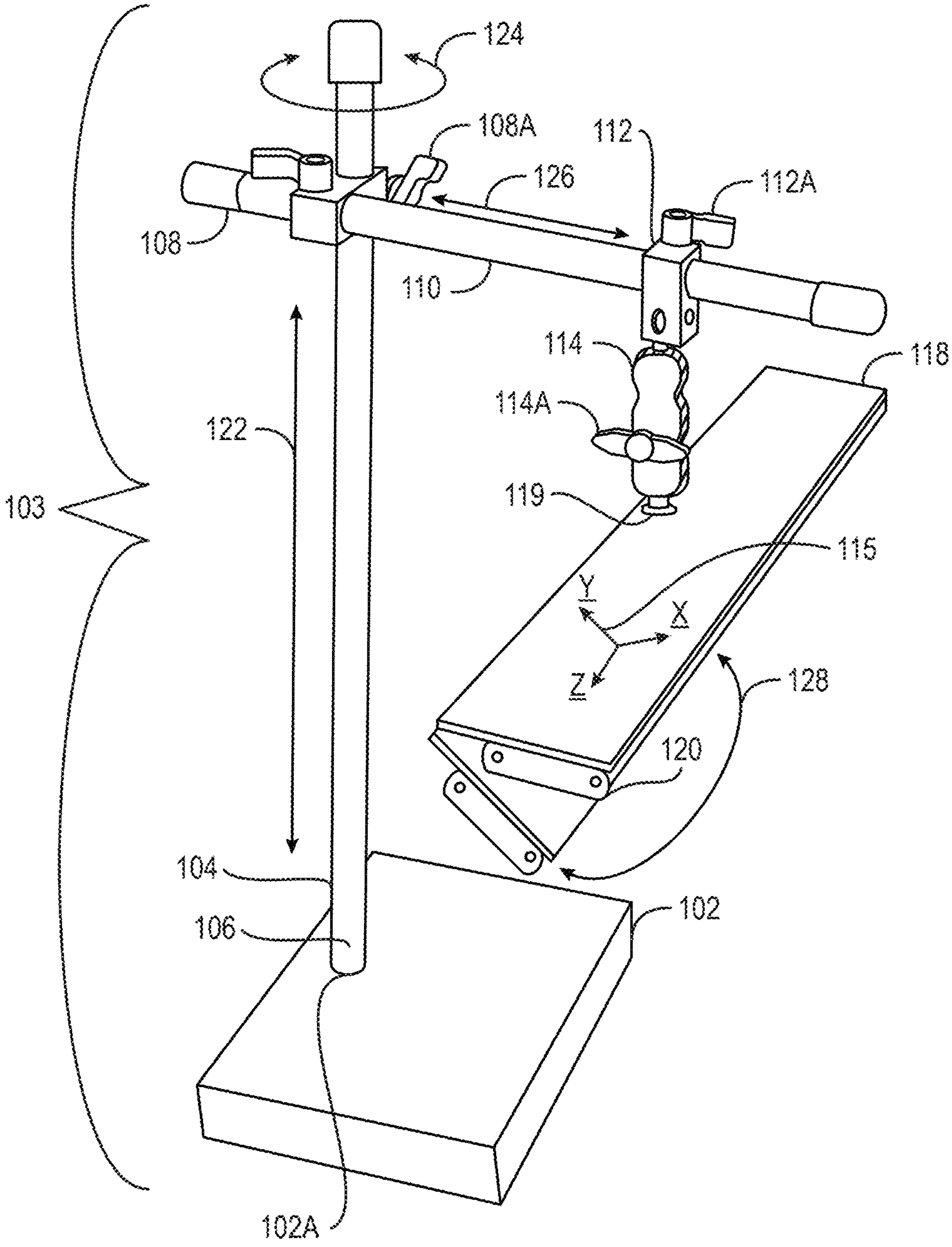
FIG. 1A is a perspective view of the post beam lighting system and method 100 of the present disclosure and FIG. 1B is a side view of a multi-axis linkage 114 and light plank.
Figure 1B:
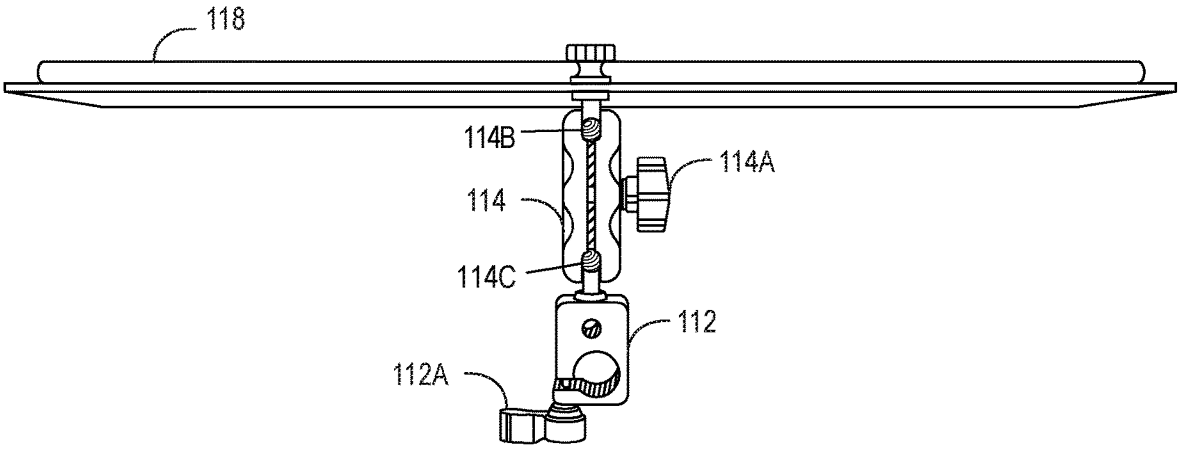

As shown in FIG. 1A, the post beam lighting system and method 100 (or light assembly) is lightweight and portable and with the upper assembly 103 being easily detachable from the base 102, a table, the edge of a table, to a piano or wall-mounted above a reading chair through the use of different bases. The upper assembly 103 can easily be detached from the base 102. The base 102 can come in several shapes and sizes as disclosed herein. The system and method 100 components are interchangeable. They include base 102 supporting a post sleeve (or post bushing) 106 which is a substantially vertical support member. A first post (or rod) 104 is connected through a first post (or rod) clamp 108 to a second post (or rod or support arm) 110. The second post 110 can be a substantially horizontal cantilevered arm and serves as a rail for the light plank 118. The first post 104 and second post 110 can be made of a solid material or they can be hollow tubes (e.g., plastic). The second post 110 is connected at one side to the first post clamp 108 and at the other side to a second post sleeve (or bushing) 112 The second post sleeve 112 is coupled to a multi-axis linkage (or universal joint or ball joint) 114 as shown in FIGS. 1A and 1B. The multi-axis linkage 114 is coupled to a light plank 118 through a lamp nut or quick connect plate 119. The light plank 118 supports an illuminating device (e.g., LED lamp, LED array) 120. (It should be noted that although the terms vertical and horizontal are used herein to describe the positions of the first post and second post, they are not being used to limit the positioning of the first and second posts or their orientation to each other and they could be used at or adjusted to any angle in real world operations).

The substantially rectangular base 102 provides mass and low center of gravity for stability under cantilever loads. Base 102 may be fabricated from dense materials (e.g., weighted wood species, metal, or filled polymer) selected according to expected moment arm and torque. The vertical post sleeve (or bushing) 106 is rigidly affixed to base 102, serving as a fixed guide for a first vertical post 104. The first post 104 may be solid or tubular (e.g., aluminum, steel, or rigid polymer) and is approximately 254 millimeters (mm) to 508 mm in length depending on desired reach. The first clamp 108 (adjustment knob-to-lock mechanism 108A) secures post 104 to a second post (horizontal arm) 110. Clamp 108 permits: vertical translation of arm 110 along post 104 (arrow 122) and 360° rotation about the vertical axis (arrow 124). The horizontal second post (or arm) 110 functions as a linear rail approximately 200 mm to 267 mm long and is supported in cantilever from clamp 108. The second post 110 may be solid or tubular for reduced weight. The second clamp (or carriage) 112 slides along the second post 110 and locks via adjustment knob 112A (e.g., thumb-screw or cam lever). The second clamp 112 provides lateral translation (arrow 126) without introducing vertical deflection under load. A multi-axis linkage 114 attaches to the second clamp 112 and supports the light plank 118 via quick-connect plate 119. Linkage 114 incorporates: primary vertical pivot 114B for height/raise-lower adjustment; secondary articulation (e.g., butterfly or clover knob 114A) for tilt and rotation; and ball-and-socket 114C or equivalent spherical joint for pitch and yaw, enabling glare-free beam aiming in three planes (arrow 128). The light plank 118 is an elongated, low-profile housing approximately 3 mm to 4 mm thick containing an illuminating device 120. The plank 118 mounts centrally to the linkage 114 for balanced mass distribution. In one configuration, plank 118 detaches completely for standalone use or charging. Alternatively, the illuminating device 120 may couple directly to linkage 114 via a quick connector, omitting the plank 118. The entire upper assembly (posts 104 and 110, second clamp 112, linkage 114, plank 118) detaches from base 102 for reconfiguration or folding. When detached, the second post subassembly folds compactly at clamp 108.

Figure 2:
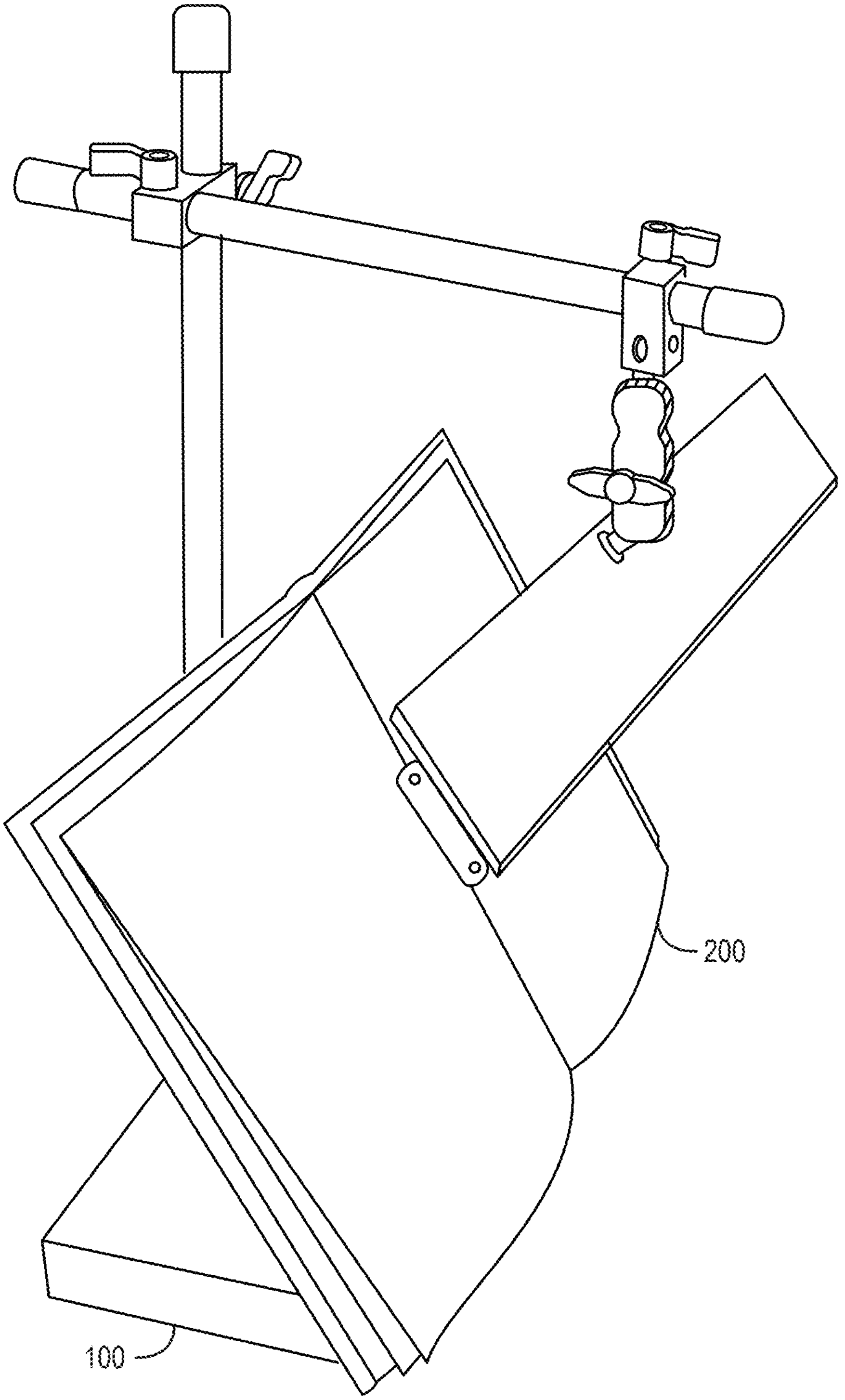
FIG. 2 shows an exemplary use of the post beam lighting system and method 100.

FIG. 2 shows the system and method 100 used to read sheet music 200 (e.g., piano music). Returning to FIG. 1, the multi-axis linkage assembly 114 is a multi-axis linkage system which moves in all 3 of the xyz axes. It allows the light plank 118 to be adjusted in all three planes 115. In one embodiment the multi-axis linkage assembly 114 is a quick connector for removal of the light plank 118 for charging. In an alternative embodiment the system and method 100 does not include the light plank 118 but rather connects the illumination device 120 directly to the structure with a quick connector affixed to the illumination device 120.

Figure 3:
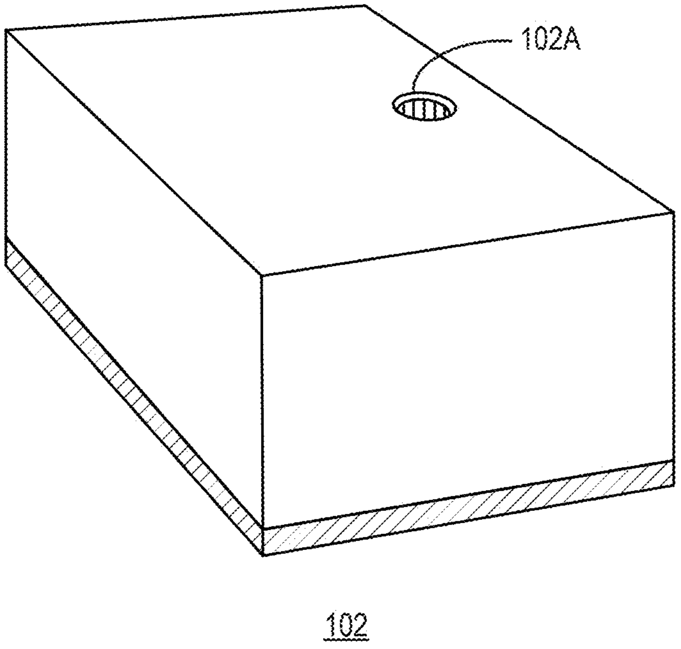
FIG. 3 shows a perspective view of the base 102.

The system and method 100 can separate from the base 102 shown in detail in FIG. 3. The upper assembly 103 can be removed from its base 102, folded and used with other types of bases 102 (which will be discussed below). The base 102 provides stability for the cantilevered components in the upper assembly 103 of the system 100. The base 102 may be made from different species and weights of wood depending on the foot-torque created by the configuration weight.

Figure 4:
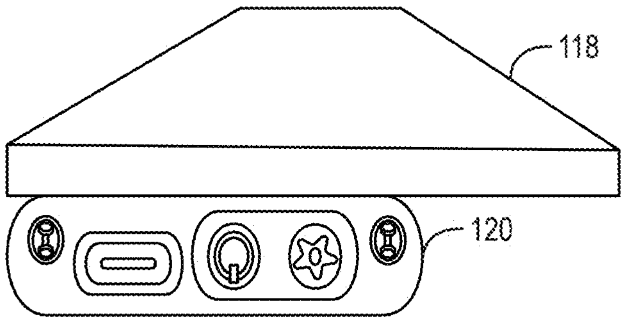
FIG. 4 shows a side elevational view of the light plank 118 and light emitting diode (LED) lamp 120.
Figure 5:
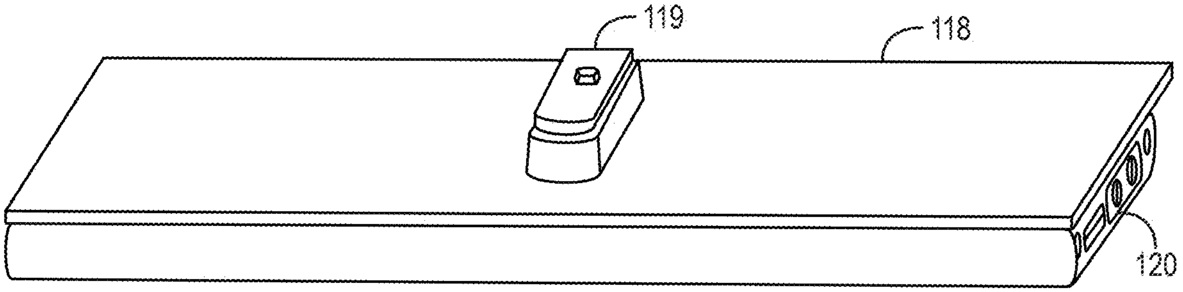
FIG. 5 top perspective view of the light plank and LED lamp 120.
Figure 6:
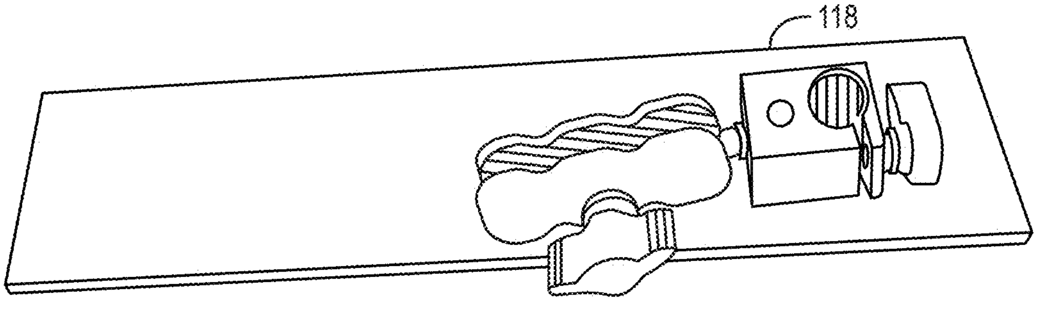
FIG. 6 is a bottom perspective view of the light plank 118 and LED lamp 120.

FIGS. 4-6 show various views of the light plank 118 and illumination device 120. In one embodiment, the light plank 118 can be detached from the system 100 and used at another location. The light plank is a low-profile, elongated structure. The plank 118 is attached to the linkage system 114 at its center point by quick connect plate 119, ensuring balanced weight distribution during adjustment. The thin profile of the plank 118 is designed to provide high-intensity illumination by the illumination device 120 while maintaining a minimal physical footprint within the user's line of sight.

Returning to FIG. 1A, the system and method 100 can be moved in accordance with arrows 122, 124, 126 and 128 as discussed above. First post vertical arrow 122 shows movement of the second post 110 up down along the first post 104 by loosening and then tightening a first adjustment knob 108A on the first rod clamp 108 to position the illumination device 120. First post swivel arrow 124 shows the movement of the second post 110 around the first post 104. Second post arrow 126 shows the sliding movement of the second post clamp 112 along the second post 110 by loosening a second adjustment knob 112A on the second post clamp 112. The second post clamp 112 is a slidable carriage running in a substantially horizontal direction along the second post 110. This carriage includes a tightening knob (e.g., a thumbscrew or wing nut) on the superior surface, which allows the user to lock the carriage at any point along the longitudinal axis of the horizontal arm. This enables precise lateral positioning of the light source relative to the base 102.

Extending downward from the second clamp 112 is the linkage assembly 114 characterized by a vertical pivot point, an articulation joint, and a ball and socket interface. The vertical pivot point is a primary joint allowing the illuminating device 120 to be raised or lowered relative to the horizontal second post. The articulation joint is a secondary "butterfly" or "clover" shaped adjustment knob 114A that facilitates tilting and rotation of the light panel. The ball-and-socket interface is a lower coupling that allows the illuminating device 120 to be pitched or yawed to eliminate glare on work surfaces. The light plank arrow 128 shows the tilting of the light plank 118 along with the illumination device 120. Adjustment knob 114A allows for loosening of the multi-axis linkage 114. As discussed, the lighting assembly is adjustably coupled to the horizontal arm via a multi-component linkage system, allowing for independent translation along the arm and rotational adjustment of the light source across multiple planes. The illumination device 120 can have a lamp with three distinct colors—warm, cool and cold. Each color can be adjusted to dim or brighten them. In FIG. 4, the button closest to the user turns the lamp on and off or can be set on motion detection. If the lamp is blinking it is set on motion detection. The button farthest from the user changes the color—warm, cool or cold. After choosing one color, the user can return to the button closest to the pianist and adjust the color's brightness. Cold color is the brightest setting and top intensity. The lamp will remember the last setting when turned on again.

FIG. 6 shows the light plank 118 removed from the second post 110. The multi-axis linkage assembly (i.e., universal or ball joint) 114 is shown folded flat against the top of the light plank 118. The knob 114A tightens or loosens pressure on the balls (i.e., spheres) within the multi-axis linkage 114. FIG. 6 conveys the light-plank's 118 portability without supporting structure and ability to be used on a different base having a supporting structure.

Figure 7:
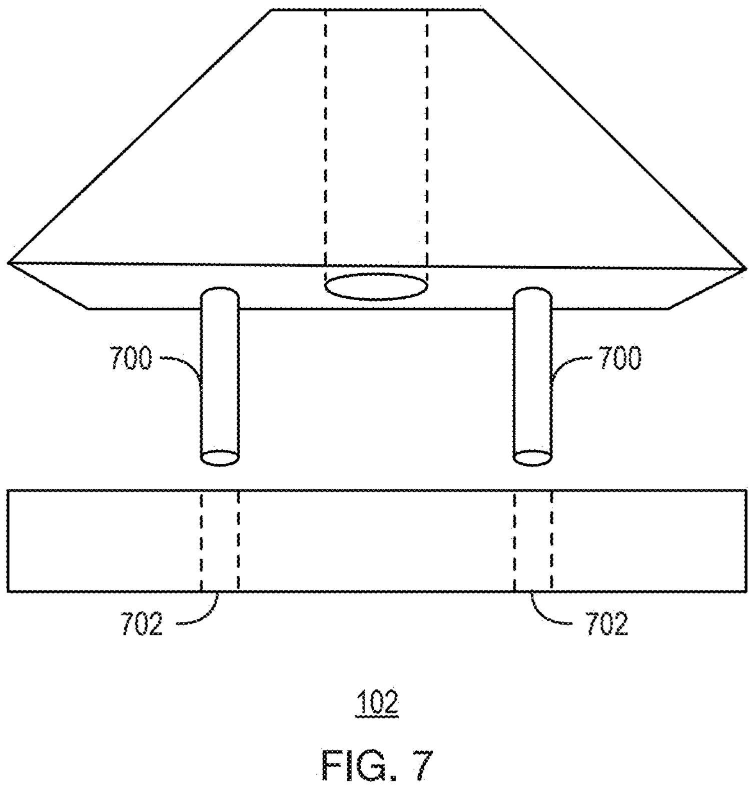
FIGS. 7 and 8 shows perspective views of an alternative embodiment of the base 102 in a trapezoidal shape.
Figure 8:
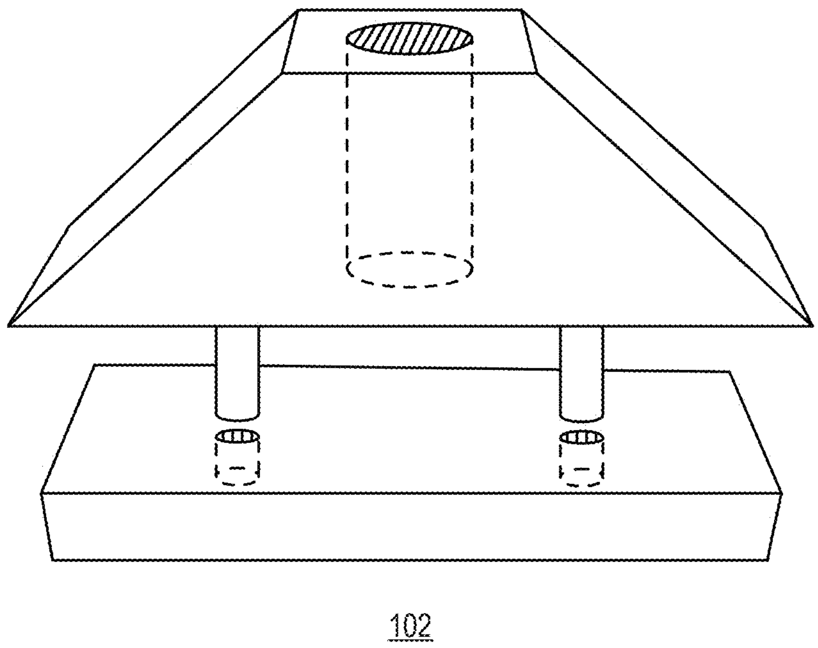

FIGS. 7 and 8 show perspective views of an alternative embodiment of the base 102 in a trapezoidal shape. In this embodiment, dowel-pins 700 push into holes 702 on a surface, typically a table, creating a solid base of small footprint. The trapezoidal base 102 shown is one of many shapes possible that use dowel-pins 700 to install or remove the lamp base from a table. The dowel-pins 700 can be carbon rod, metal such as stainless steel or a polymer. This base 102 allows use of the lamp on a small surface area not suitable for a larger base or an edge-grip base.

Figure 9:
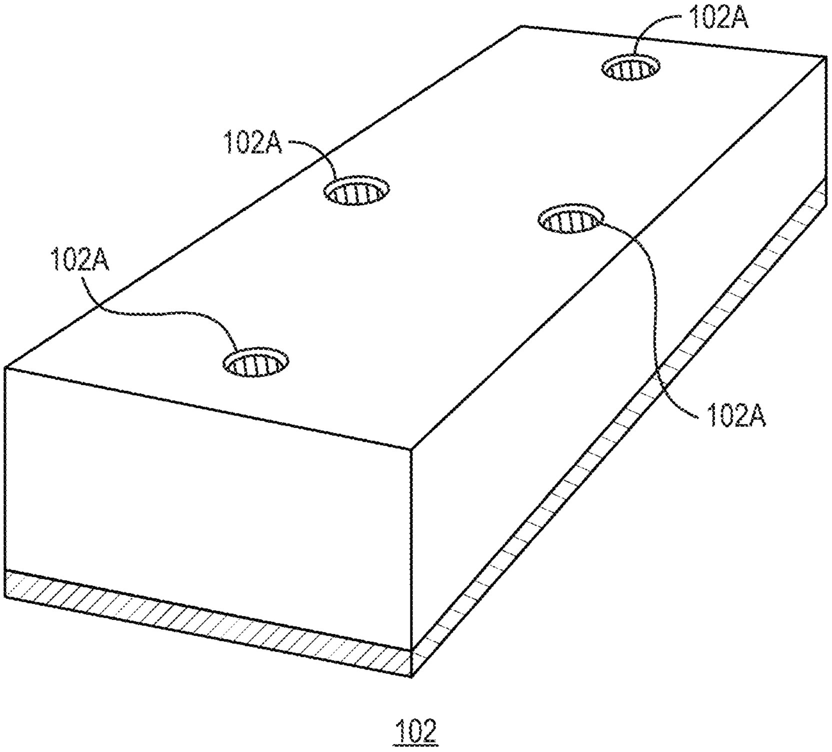
FIG. 9 shows perspective view of another alternative embodiment of the base 102 which is capable of supporting multiple post beam lighting systems.

FIG. 9 shows perspective view of another alternative embodiment of the base 102 which is a flat, weighted pedestal base capable of supporting multiple post beam lighting systems. In this embodiment, the base 102 is configured to serve a base for the system and method 100 on a flat surface such as a table in a library. FIG. 9 has multiple sleeves 102A to hold multiple light upper assemblies 103. The table can be configured to serve as a base for many post beam lights 100 such as in a library. Patrons can bring their light plank 118 or only the illuminating device 120 to connect to the table's post-beam installation.

Figure 10:
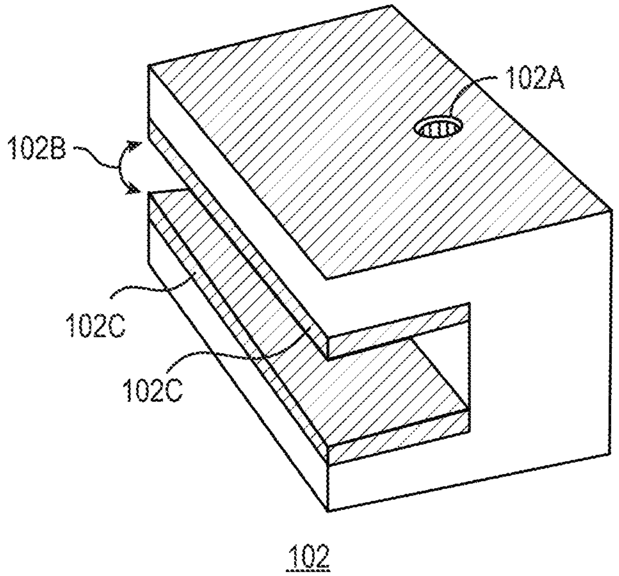
FIG. 10 shows another exemplary use of the post beam lighting system and method 100 with the base 102 in the form of a c-clamp.

FIG. 10 shows the base 102 in the form of C-shaped clamp. In an alternative embodiment, the c-shaped clamp base can be adjustable in width 102B. The C-shaped clamp has an edge grip 102C which is made of a resilient, grip material. The C-shaped clamp base 102 uses the resilient grip layer 102C (e.g., silicone, rubber) for compressive attachment to table edges or bars without screws.

Figure 11:
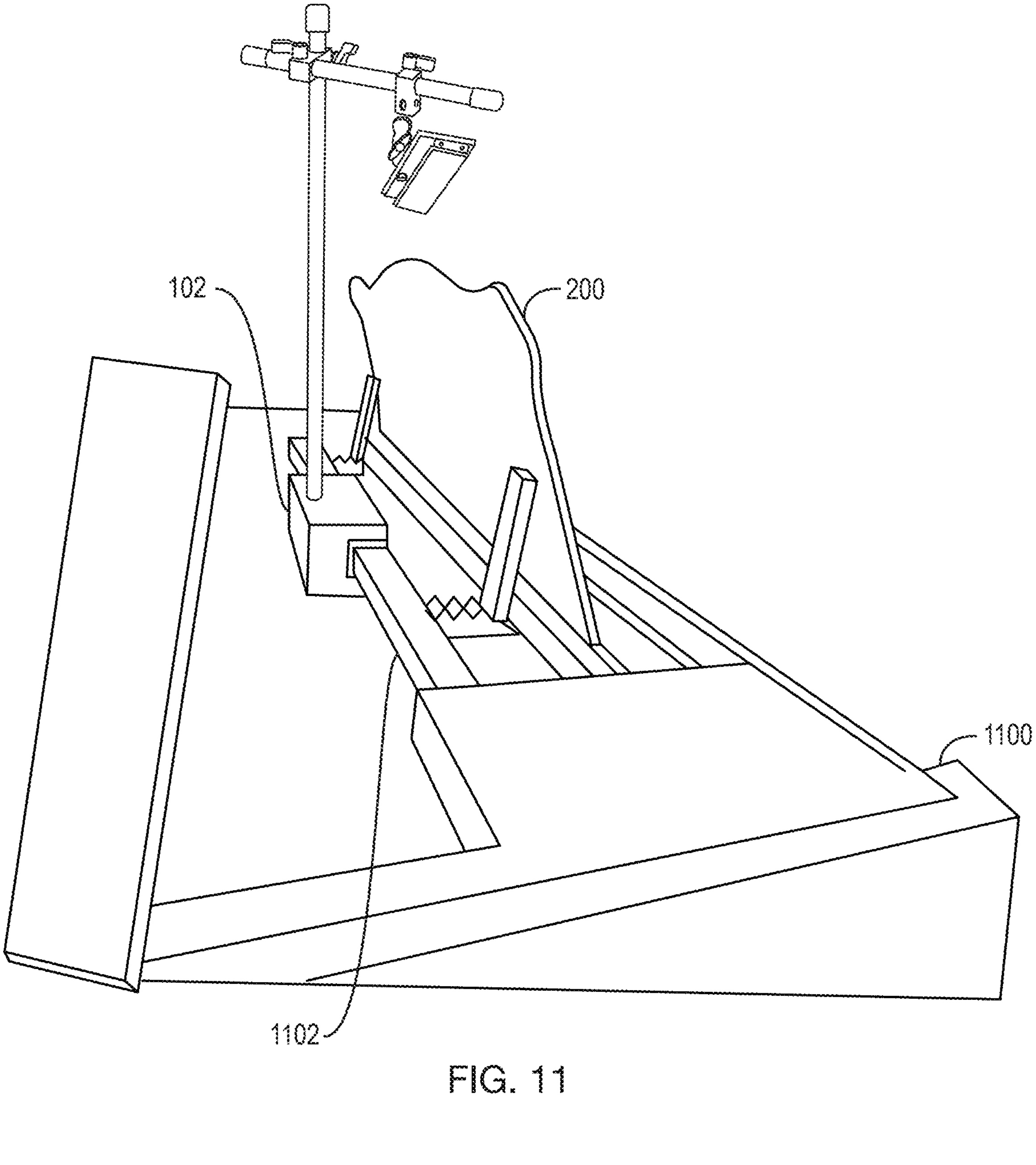
FIG. 11 shows the C-clamp base being used with piano.

FIG. 11 shows the C-shaped clamp base being used with piano 1100. The base 102 may be made for table edge or a grand piano's music stand's cross-piece (or cross-rails) 1102 which uses neither conventional springs nor threaded clamping for attachment. It uses the intrinsic strength of the item to which it is attached. The edge grip 102C is sized to engage music desk cross-rails 1102 on the grand piano 1100 directing light toward sheet music 200.

Figure 12:
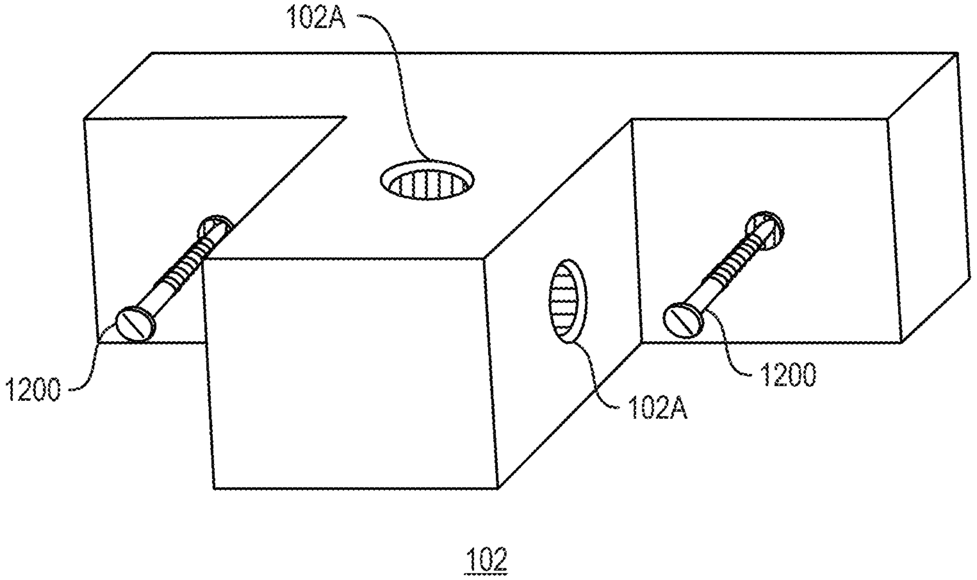
FIG. 12 shows a base for mounting the lamp on a wall horizontally.

FIG. 12 shows a base 102 for mounting the system and method 100 on a wall horizontally with screws 1200.

Figure 13:
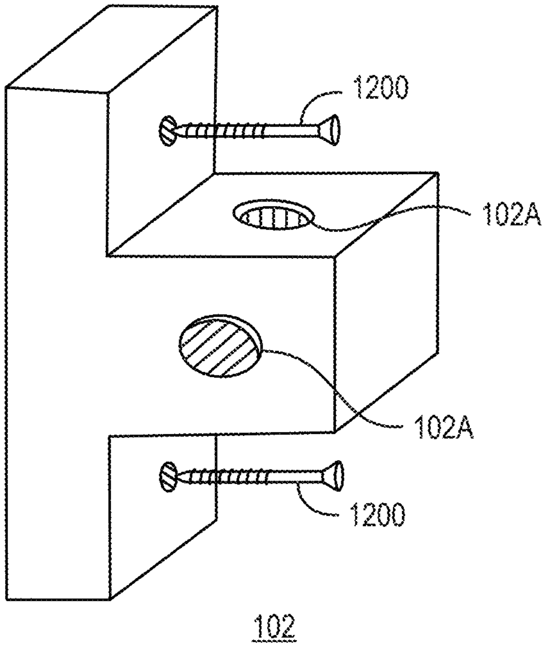
FIG. 13 shows a base for mounting lamp on a wall vertically.

FIG. 13 shows a base 102 for mounting lamp on a wall vertically with both screws 1200 going into a wall stud.

Figure 14:
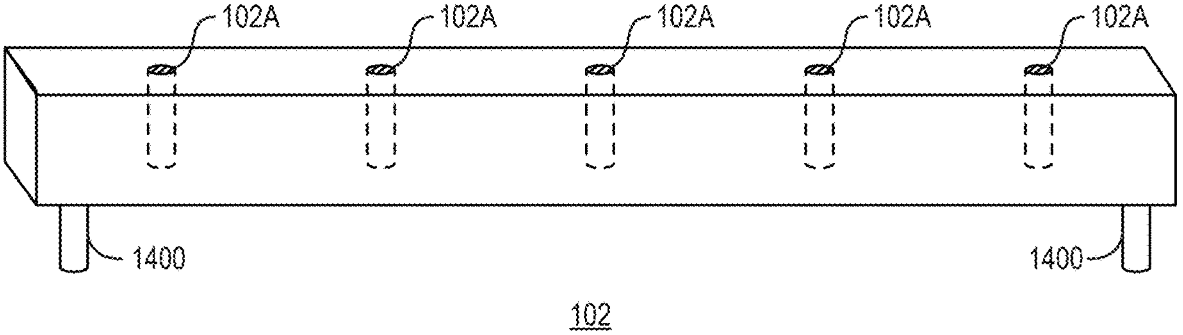
FIG. 14 shows a table bar base that installs on a tabletop having base bushings (aka wear sleeves, post sleeves).
Figure 15:
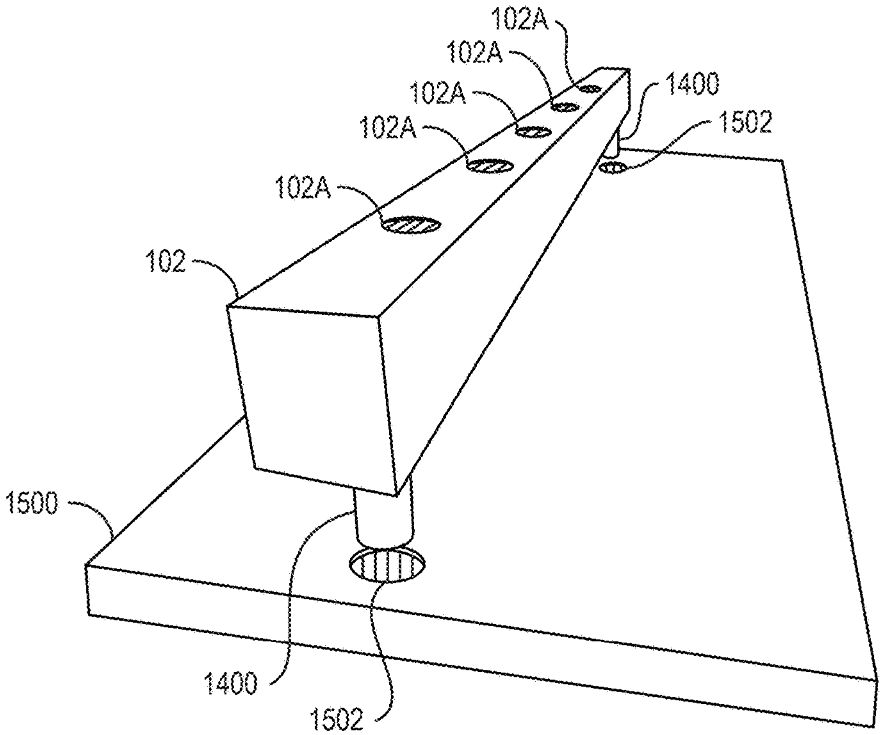
FIG. 15 shows a table bar base that installs on a tabletop having base bushings with wear sleeves, post sleeves.

FIGS. 14 and 15 show a table bar base 102 that installs on a tabletop 1500 with base bushings (or wear sleeves or post sleeves) 1400.

FIG. 15 shows the tabletop 1500 having holes 1502 for receiving base bushings 1400 (wear sleeves or post sleeves). Alternatively, there could be base bushings 1400 installed directly in a table likely the middle of table for direct upper assembly 103 installation.

Figure 16:
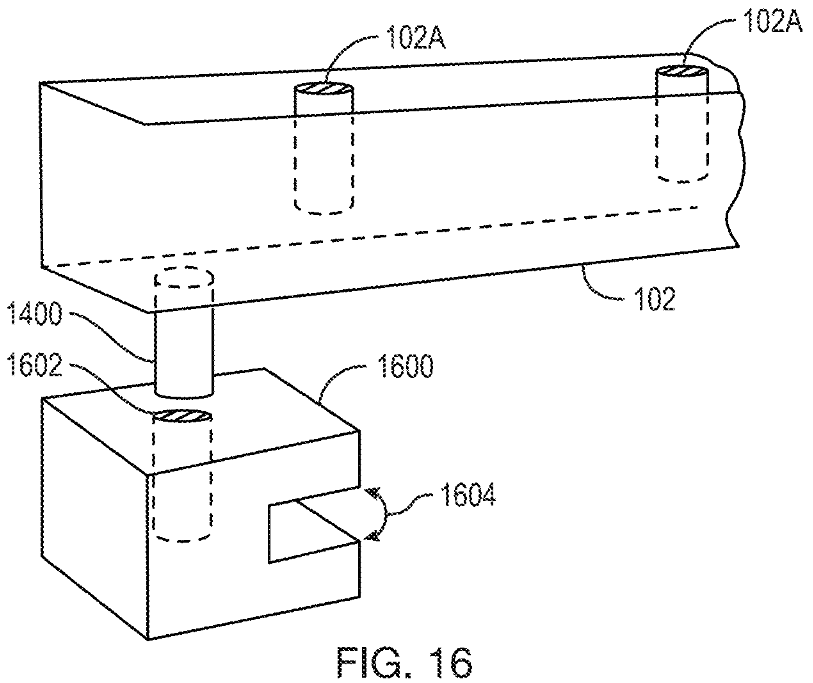
FIGS. 16 and 17 show the table bar base installed on a table using edge grips.
Figure 17:
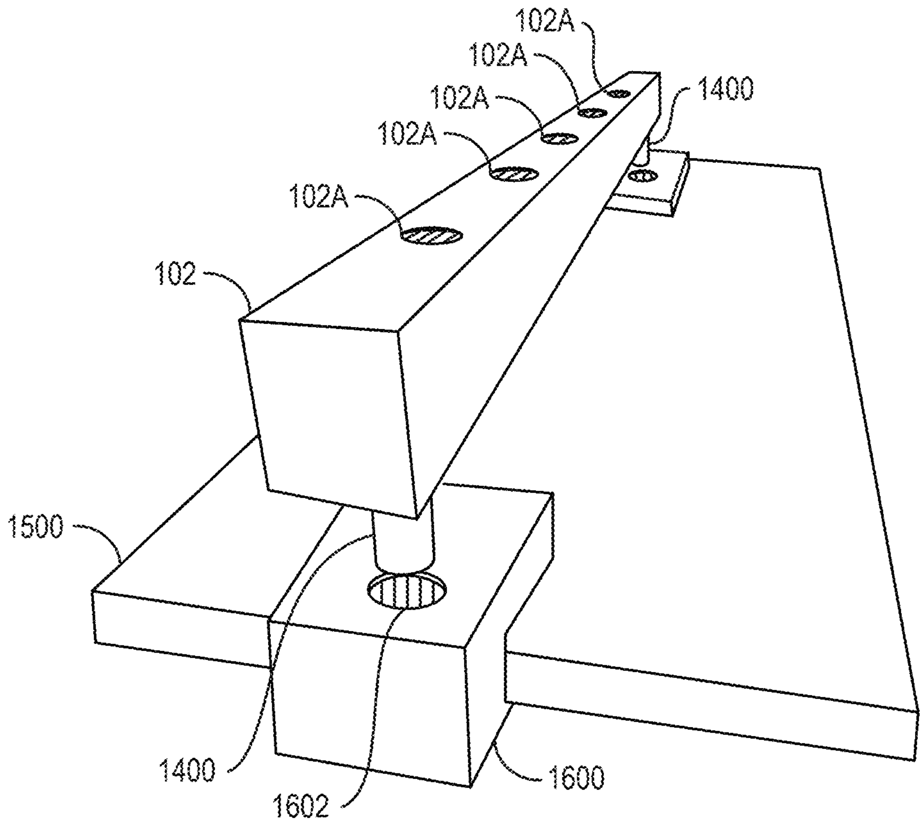

FIGS. 16 and 17 show the table bar base 102 installed on a table 1500 using C-clamp 1600 with holes 1602 for receiving bushings 1400 and edge grips 1604 for clamping on to a surface such as a table or the like.

Figure 18:
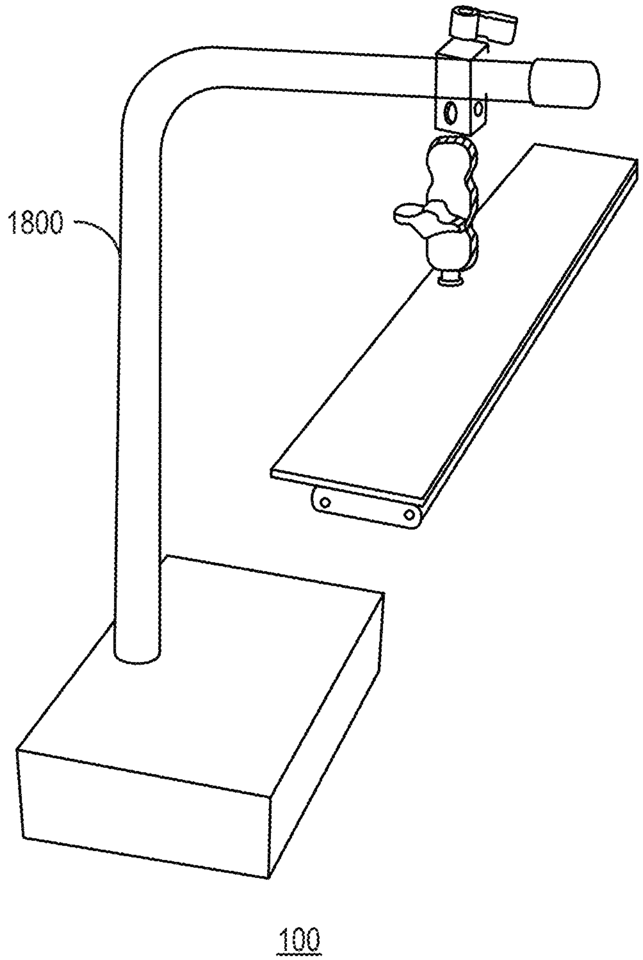
FIG. 18 shows an alternative embodiment with a bent tube replacing the first and second posts and FIG. 19 shows a side view of the bent tube.

FIG. 18 shows an alternative embodiment with a bent tube 1800 replacing the first and second posts. A use for this embodiment may be an institution that needs budget lighting fast for an event with not ideal lighting and by use of the table clamps or modified tables with rod bushings installed directly therein, can rapidly install uniform rod/tube piece lighting for such an event. Alternatively, a user who wants a cheaper cost lamp and is willing to cut the tube 1800 to suit their use-case needs.

Figure 19:
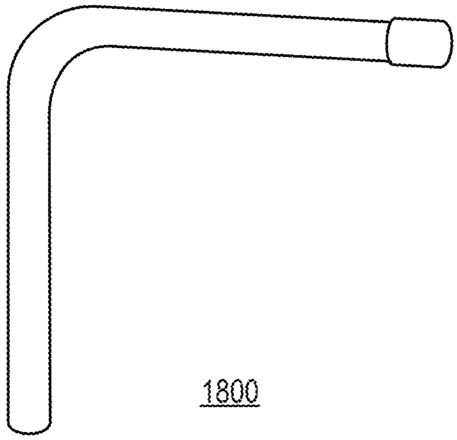

FIG. 19 shows a side view of a bent tube by itself.

Referring back to FIG. 1, the operation adjustment sequence is as follows:

1. Loosen clamp 108 to set height (vertical translation) and azimuth (rotation) of horizontal second post (arm) 110.
2. Loosen knob 112A to slide clamp (or carriage) 112 to desired lateral position along second post 110.
3. Loosen linkage knob 114A to set elevation via vertical pivot, tilt via secondary joint, and fine beam direction via ball-socket.
4. Tighten all locks to maintain position under typical task loads. In an exemplary embodiment, the lamp plank has hardware that slips on the beam weighs approximately 0.80 pounds and three inches from post on beam the lamp would create an approximately 0.2 foot pounds/torque.

The lamp 100 has a very slight foot pounds torque, and thus a sag created by the lamp occurs only when the lamp head is moved on the second post to point along the second post farthest from the first post. This very slight sag is easily compensated for by pitch adjustment of lamp head along its horizonal axis, if even necessary. Tool-less clamps and quick-connects enable reconfiguration in seconds without auxiliary tools. Modular design supports field replacement of worn components (e.g., posts, clamps, linkage elements).

The system and method 100 distinguishes itself through its tool-less modularity and the use of intrinsic strength for mounting. Unlike traditional articulated or gooseneck lamps that rely on friction-heavy springs or threaded screw clamps—which are prone to material fatigue and sagging—the present system and method 100 utilizes a sliding carriage and post-bushing architecture. This allows for independent translation along a horizontal rail without the vertical "sag" common in cantilevered lamps. Furthermore, the base configuration avoids conventional threaded clamping by utilizing the intrinsic strength of the mounting surface, such as a piano music stand.

No internal springs or friction sleeves subject to long-term creep/fatigue. Independent linear translation and multi-axis aiming without compound linkage stacking. Mounting relies on surface geometry and compression rather than threaded mechanisms. Full disassembly for portability, repair, or component swap.

There remains a need for a task lighting system that offers:

Stable, repeatable positioning without reliance on springs or screw clamps.

Tool-less assembly and disassembly for rapid reconfiguration.

High portability (backpack-compatible when folded).

Modular, user-replaceable components.

Multiple mounting modes utilizing the intrinsic geometry and strength of the support surface (e.g., table edge, piano music desk rail).

Omnidirectional beam aiming with independent translation and multi-axis rotation.

Aspects of the described embodiments include:

Tool-less quick-release interfaces at major joints.

Linear sliding along the horizontal arm for lateral positioning without vertical droop.

Independent height, rotation, tilt, and pitch/yaw adjustment via a carriage and universal linkage.

Interchangeable bases (pedestal, edge-grip, C-style clamp with resilient grip insert) that avoid threaded fasteners by leveraging compressive or frictional engagement with the mounting surface.

Foldable configuration for compact storage/transport.

The configuration eliminates fatigue-prone flex elements and enables user-level repair through part swapping.

The foregoing embodiments are presently by way of example only; the scope of the present disclosure is to be limited only by the claims. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples. Additional features and advantages will be described hereinafter. The conception and specific examples disclosed can be readily utilized as a basis for modifying or designing other structures for carrying out the same purposes of the present disclosure. Such equivalent constructions do not depart from the spirit and scope of the appended claims. Each of the figures is provided for the purpose of illustration and description only and not as a definition of the limits of the claims. No language in the specification should be construed as indicating any non-claimed element as essential to the practice of the disclosed embodiments.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The foregoing described embodiments have been presented for purposes of illustration and description and are not intended to be exhaustive or limiting in any sense. Alterations and modifications may be made to the embodiments disclosed herein without departing from the spirit and scope of the disclosure. No language in the specification should be construed as indicating any non-claimed element as essential to the practice of the disclosure. The specification and drawings are, accordingly, to be regarded in an illustrative sense rather than a restrictive sense.

Some embodiments were described as processes. Although these processes may describe the operations as a sequential process, many of the operations can be performed in parallel or concurrently. In addition, the order of the operations may be rearranged. A process may have additional steps not included in the figures. Also, a number of steps may be undertaken before, during, or after the above elements are considered. Although process (or method) steps may be described or claimed in a particular sequential order, such processes may be configured to work in different orders. In other words, any sequence or order of steps that may be explicitly described or claimed does not necessarily indicate a requirement that the steps be performed in that order unless specifically indicated. Further, some steps may be performed simultaneously despite being described or implied as occurring non-simultaneously (e.g., because one step is described after the other step) unless specifically indicated. Moreover, the illustration of a process by its depiction in a drawing does not imply that the illustrated process is exclusive of other variations and modifications thereto, does not necessarily imply that the illustrated process or any of its steps are necessary to the embodiment(s), and does not imply that the illustrated process is preferred.

Specific details are given in the description to provide a thorough understanding of the embodiments. However, embodiments may be practiced without these specific details. For example, well-known processes, structures, and techniques have been shown without unnecessary detail in order to avoid obscuring the embodiments. This description provides example embodiments only, and is not intended to limit the scope, applicability, or configuration of the disclosure. Rather, the preceding description of the embodiments will provide those skilled in the art with an enabling description for implementing embodiments of the disclosure. Various changes may be made in the function and arrangement of elements without departing from the spirit and scope of the disclosure.

Having described several embodiments, various modifications, alternative constructions, and equivalents may be used without departing from the spirit of the disclosure. For example, the above elements may merely be a component of a larger system, wherein other rules may take precedence over or otherwise modify the application of the disclosure. Accordingly, the above description does not limit the scope of the disclosure.

It should be noted that the recitation of ranges of values in this disclosure are merely intended to serve as a shorthand method of referring individually to each separate value falling within the range, unless otherwise indicated herein, and each separate value is incorporated into the specification as if it were individually recited herein. Therefore, any given numerical range shall include whole and fractions of numbers within the range. For example, the range "1 to 10" shall be interpreted to specifically include whole numbers between 1 and 10 (e.g., 1, 2, 3, . . . 9) and non-whole numbers (e.g., 1.1, 1.2, . . . 1.9).

Although specific advantages have been enumerated above, various embodiments may include some, none, or all of the enumerated advantages.

To aid the Patent Office and any readers of any patent issued on this application in interpreting the claims appended hereto, applicants wish to note that they do not intend any of the appended claims or claim elements to invoke 35 U.S.C. 132(f) unless the words "means for" or "step for" are explicitly used in the particular claim.

The definitions of the words or elements of the claims shall include not only the combination of elements which are literally set forth, but all equivalent structure, material or acts for performing substantially the same function in substantially the same way to obtain substantially the same result.

Neither the Title (set forth at the beginning of the first page of the present application) nor the Abstract (set forth at the end of the present application) is to be taken as limiting in any way as the scope of the disclosed disclosure(s). The title of the present application and headings of sections provided in the present application are for convenience only, and are not to be taken as limiting the disclosure in any way.

What is claimed is:

1. A modular task lighting system comprising:

a base having a post sleeve;

a first post removably inserted into the post sleeve;

a first clamp adjustably connecting a second post to the first post, the first clamp configured to permit vertical translation of the second post along the first post and 360-degree rotation of the second post about a vertical axis of the first post;

the second post configured as a substantially horizontal cantilevered rail;

a second clamp slidably mounted on the second post and configured for lateral translation along the second post without vertical deflection under load, the second clamp comprising a tightening knob to lock the second clamp at a selected position;

a multi-axis linkage coupled to the second clamp, the multi-axis linkage comprising: a primary vertical pivot configured for height adjustment, a secondary articulation joint comprising a knob configured for tilt and rotation adjustment, and a ball-and-socket joint configured for pitch and yaw adjustment to enable aiming in three planes;

a light plank detachably coupled to the multi-axis linkage via a quick-connect plate, the light plank comprising a low-profile elongated housing supporting an illuminating device; and wherein an upper assembly comprising the first post, the second post, the first clamp, the second clamp, the multi-axis linkage, and the light plank is detachable from the base.

2. The modular task lighting system of claim 1, wherein the base is interchangeable and selected from at least one of the group consisting of:

a weighted pedestal base providing stability under cantilever loads, a C-shaped clamp base comprising a resilient grip layer for compressive attachment to a table edge or piano music desk rail without threaded fasteners, leveraging intrinsic strength of a mounting surface, a wall-mount base configured for horizontal or vertical mounting to a wall stud, a table bar base comprising edge grips and base bushings for installation on a tabletop, and a flat weighted pedestal base comprising multiple post sleeves configured to support multiple upper assemblies.

3. The modular task lighting system of claim 1, wherein the light plank is centrally mounted to the multi-axis linkage for balanced mass distribution and wherein the light plank is configured to detach completely from the multi-axis linkage for standalone use or charging.

4. The modular task lighting system of claim 1, wherein the illuminating device comprises an LED array configured to provide adjustable color temperatures including warm, cool, and cold settings, and adjustable brightness levels with controls comprising an on/off button configurable for motion detection and a color selection button.

5. The modular task lighting system of claim 1, wherein the first post and the second post are hollow tubes, and wherein the system is configured for tool-less assembly and disassembly, enabling rapid reconfiguration and field replacement of components.

6. The modular task lighting system of claim 1, wherein the second clamp is configured as a slidable carriage that eliminates sag inherent in articulated arms by providing independent linear translation along the second post.

7. The modular task lighting system of claim 1, wherein the base is a C-shaped clamp base comprising a resilient grip layer and an edge grip sized to engage a music desk cross-rail on a grand piano for directing light toward sheet music.

8. The modular task lighting system of claim 1, wherein the upper assembly folds compactly at the first clamp when detached from the base enabling portability.

9. The modular task lighting system of claim 1, wherein the base is a flat, weighted pedestal base comprising multiple post sleeves, configured to support multiple upper assemblies on a table surface, such as in a library setting, allowing patrons to connect personal light planks or illuminating devices.

10. The portable task lighting system of claim 1, wherein the base is a C-clamp and configured to attach to a piano music desk rail using compressive engagement.

11. A method of assembling a modular task lighting system comprising:

providing an interchangeable base with a post sleeve;

removably inserting a first post into the post sleeve;

adjustably clamping a second post to the first post using a first clamp to enable vertical translation and rotation;

slidably mounting a second clamp on the second post for lateral translation;

coupling a multi-axis linkage to the second clamp, the multi-axis linkage including a vertical pivot, articulation joint, and ball-and-socket;

detachably coupling a light plank with an illuminating device to the multi-axis linkage via a quick-connect plate; and wherein the method enables tool-less reconfiguration, detachment of an upper assembly for folding, and interchange of the base.

12. The method of claim 11, further comprising:

loosening the first clamp to allow vertical translation of the second post along the first post and rotation of the second post about the vertical axis of the first post;

positioning the second post at a desired height and azimuthal orientation;

tightening the first clamp to lock the height and rotation;

loosening the tightening knob of the second clamp;

sliding the second clamp along the second post to a selected lateral position; and tightening the tightening knob of the second clamp to lock the lateral position without introducing vertical deflection under load.

13. The method of claim 11, further comprising adjusting the illuminating device in three planes by:

loosening the knob of the secondary articulation joint to allow tilt and rotation adjustment;

loosening the ball-and-socket joint to allow pitch and yaw adjustment;

aiming the light plank to achieve glare-free illumination on a target surface; and tightening the knob and ball-and-socket joint to maintain the selected orientation.

14. The method of claim 11, further comprising detaching the upper assembly from the base by removing the first post from the post sleeve of the base enabling:

folding the upper assembly compactly at the first clamp;

reconfiguring the upper assembly with a different interchangeable base selected from the group consisting of a weighted pedestal base, a C-shaped clamp base with resilient grip layer, a wall-mount base, and a table bar base with edge grips; and re-attaching the upper assembly to the selected different base without tools.

15. The method of claim 11, further comprising:

detaching the light plank from the multi-axis linkage via the quick-connect plate;

using the detached light plank as a standalone portable illuminating device; and re-attaching the light plank to the multi-axis linkage or to a different multi-axis linkage of another lighting system.

16. The method of claim 11, wherein the base is a C-shaped clamp base comprising a resilient grip layer, and the method further comprises:

positioning the C-shaped clamp base onto an edge of a table or onto a music desk cross-rail of a grand piano;

compressively engaging the resilient grip layer with the mounting surface to secure the base using intrinsic strength of the mounting surface without threaded fasteners or screws; and directing illumination from the light plank toward sheet music resting on the music desk.

17. The method of claim 11, further comprising:

selecting a color temperature of the illuminating device from the group consisting of warm, cool, and cold;

adjusting a brightness level of the selected color temperature; activating a motion detection mode via an on/off control such that the illuminating device blinks to indicate motion detection is active; and causing the illuminating device to retain the last selected color temperature and brightness setting upon subsequent activation.

18. The method of claim 11, further comprising:

providing a flat weighted pedestal base comprising multiple post sleeves;

inserting the first post of a first upper assembly into a first post sleeve of the pedestal base; inserting the first post of a second upper assembly into a second post sleeve of the pedestal base; and independently positioning and aiming each of the first and second upper assemblies to illuminate different work areas on a shared table surface.

* * * * *